United States Patent
Xu et al.

(10) Patent No.: US 11,929,667 B2
(45) Date of Patent: Mar. 12, 2024

(54) SWITCHING CONVERTER AND LOW-VOLTAGE STARTUP CIRCUIT THEREOF

(71) Applicant: SG MICRO CORP, Beijing (CN)

(72) Inventors: Jing Xu, Beijing (CN); Shoubao Yan, Beijing (CN); Xiang Yu, Beijing (CN)

(73) Assignee: SG MICRO CORP, Beijing (CN)

( * ) Notice: Subject to any disclaimer, the term of this patent is extended or adjusted under 35 U.S.C. 154(b) by 244 days.

(21) Appl. No.: 17/763,744

(22) PCT Filed: Sep. 4, 2020

(86) PCT No.: PCT/CN2020/113553
§ 371 (c)(1),
(2) Date: Mar. 25, 2022

(87) PCT Pub. No.: WO2021/057450
PCT Pub. Date: Apr. 1, 2021

(65) Prior Publication Data
US 2022/0345031 A1      Oct. 27, 2022

(30) Foreign Application Priority Data

Sep. 25, 2019 (CN) .......................... 201910910267.7

(51) Int. Cl.
*H02M 3/156*     (2006.01)
*H02M 1/36*      (2007.01)

(52) U.S. Cl.
CPC ............ *H02M 1/36* (2013.01); *H02M 3/156* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 7,298,117 B2    11/2007  Hasegawa et al.
7,746,160 B1 *   6/2010  Raghavan ............... G05F 3/205
                                                     327/534
(Continued)

FOREIGN PATENT DOCUMENTS

CN    1312493 A    9/2001
CN    1980025 A    6/2007
(Continued)

OTHER PUBLICATIONS

International Search Report (including English translation) and Written Opinion for International Application No. PCT/CN2020/113553, dated Dec. 8, 2020, 9 pages.

*Primary Examiner* — Jeffrey A Gblende
(74) *Attorney, Agent, or Firm* — Westman, Champlin & Koehler, P.A.

(57) ABSTRACT

A switching converter and a low-voltage startup circuit is provided. The low-voltage startup circuit includes a comparator and a substrate voltage control module. The comparator performs a comparison between an input voltage and a reference voltage and obtain a voltage detection signal according to a result of the comparison. The substrate voltage control module adjusts a substrate voltage of a main switching transistor according to the voltage detection signal, wherein when the voltage detection signal indicates that the input voltage is lower than/equal to the reference voltage, the substrate voltage control module increases the substrate voltage of the main switching transistor, and then a turn-on threshold voltage of the main switching transistor can be reduced, so that the main switching transistor may be normally turned on when the input voltage is low, and the low-voltage startup capability of the switching converter is improved.

16 Claims, 2 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H05B 39/048; B23K 11/24; H04B 2215/069

See application file for complete search history.

(56) References Cited

U.S. PATENT DOCUMENTS

| | | | | |
|---|---|---|---|---|
| 7,816,974 | B2* | 10/2010 | Araki | G05F 3/205 327/534 |
| 9,710,006 | B2* | 7/2017 | Boling | H01L 29/7851 |
| 10,324,485 | B2* | 6/2019 | Huang | G05F 3/205 |
| 2003/0011949 | A1 | 1/2003 | Ker et al. | |
| 2007/0132435 | A1 | 6/2007 | Hasegawa et al. | |

FOREIGN PATENT DOCUMENTS

| | | |
|---|---|---|
| CN | 101505094 A | 8/2009 |
| CN | 108400704 A | 8/2018 |
| CN | 110098832 A | 8/2019 |

* cited by examiner

SWITCHING CONVERTER AND LOW-VOLTAGE STARTUP CIRCUIT THEREOF

CROSS REFERENCE TO RELATED APPLICATIONS

This application is a Section 371 National Stage Application of International Application No. PCT/CN2020/113553, filed on Sep. 4, 2020, and published as WO/2021/057450 A1, on Apr. 1, 2021, not in English, which claims priority to Chinese Patent Application No. 201910910267.7, entitled "Switching Converter and Low-Voltage Startup Circuit Thereof", filed on Sep. 25, 2019, the entire contents of which are incorporated herein by reference in their entireties.

FIELD OF THE DISCLOSURE

The present disclosure relates to a technical field of switching power supplies, and more particularly, to a switching converter and a low-voltage startup circuit thereof.

DESCRIPTION OF THE RELATED ART

A switching converter is configured to convert an input voltage into a predetermined output voltage and supply it to a load. The conventional switching converter in the prior art includes a main switching transistor, a synchronous switching transistor, an inductor and a driver circuit. The driver circuit is configured to control turn-on and turn-off states of the main switching transistor and the synchronous switching transistor to make the inductor store and supply electrical energy alternately, thereby generating an output voltage and/or an output current.

FIG. 1 illustrates a schematic structural diagram of a switching converter in the prior art. The switching converter has a Boost topology. The switching converter 100 includes an inductor L1, a main switching transistor Mn, a synchronous switching transistor Mp, an output capacitor Cout and a driver circuit 110. The inductor L1 and the main switching transistor Mn are connected in series between a direct current input voltage Vin and the ground; a first current terminal of the synchronous switching transistor Mp is connected to a node coupled between the inductor L1 and the main switching transistor Mn, and a second current terminal of the synchronous switching transistor Mp is connected to a direct current output voltage Vout; and the output capacitor Cout is connected between the second current terminal of the synchronous switching transistor Mp and the ground. The driver circuit 110 is configured to control turn-on and turn-off states of the main switching transistor Mn and the synchronous switching transistor Mp. During operation of the switching converter 100, the inductor L1 stores electrical energy when the main switching transistor Mn is turned on and the synchronous switching transistor Mp is turned off, then, when the main switching transistor Mn is turned off and the synchronous switching transistor Mp is turned on, the inductor L1 supplies electrical energy to the output capacitor Cout, thereby making the direct current output voltage Vout gradually increases.

The conventional switching converter 100 has following problems: under the influence of a parasitic capacitance and a threshold voltage of the main switching transistor Mn, a startup voltage of the switching converter 100 is limited. When the direct current input voltage Vin is low, since a driving voltage of the driver circuit 110 comes from the direct current input voltage Vin, the main switching transistor Mn may not be normally turned on, and the switching converter 100 may not be started up normally.

SUMMARY OF THE DISCLOSURE

In view of the above problems, an objective of the present disclosure is to provide a switching converter and a low-voltage startup circuit thereof. Accordingly, a turn-on threshold voltage of the switching transistor is reduced, the main switching transistor may be turned on normally when an input voltage is low, and the low-voltage startup capability of the switching converter is improved.

According to a first aspect of embodiments of the present disclosure, a low-voltage startup circuit of a switching converter is provided. The switching converter comprises a main switching transistor, a synchronous switching transistor, an inductor and an output capacitor, wherein the low-voltage startup circuit comprises: a comparator, configured to perform a comparison between an input voltage and a reference voltage and obtain a voltage detection signal according to a result of the comparison; and a substrate voltage control module, configured to adjust a substrate voltage of the main switching transistor according to the voltage detection signal, wherein when the voltage detection signal indicates that the input voltage is lower than/equal to the reference voltage, the substrate voltage control module increases the substrate voltage of the main switching transistor.

Preferably, the substrate voltage control module comprises: a first transistor, a first resistor and a second transistor that are connected in series between the input voltage and the ground in sequence, wherein an intermediate node coupled between the first resistor and the second transistor is connected to a substrate of the main switching transistor, a gate of the first transistor and a gate of the second transistor receive the voltage detection signal, the first transistor is configured to charge the substrate of the main switching transistor according to the input voltage when the first transistor is turned on, and the second transistor is configured to discharge the substrate of the main switching transistor when the second transistor is turned on.

Preferably, the substrate voltage control module further comprises: a third transistor, a second resistor and a fourth transistor that are connected in series between the input voltage and the ground in sequence, wherein an intermediate node coupled between the second resistor and the fourth transistor is connected to a substrate of the first transistor; a gate of the third transistor and a gate of the fourth transistor receive an inverted signal of the voltage detection signal, the third transistor is configured to charge the substrate of the first transistor according to the input voltage when the third transistor is turned on; and the fourth transistor is configured to discharge the substrate of the first transistor when the fourth transistor is turned on.

Preferably, when the voltage detection signal indicates that the input voltage is lower than/equal to the reference voltage, the first transistor and the fourth transistor are turned on; and when the voltage detection signal indicates that the input voltage is higher than the reference voltage, the second transistor and the third transistor are turned on.

Preferably, the first transistor and the third transistor are P-type field effect transistors, and the second transistor and the fourth transistor are N-type field effect transistors.

Preferably, the low-voltage startup circuit further comprises a diode connected between the substrate and a source of the main switching transistor.

Preferably, the low-voltage startup circuit further comprises an operational amplifier, having an inverting input terminal connected to the substrate of the main switching transistor, a non-inverting input terminal configured to receive the reference voltage, and an output terminal connected with the inverting input terminal, wherein the operational amplifier is configured to clamp the substrate voltage of the main switching transistor according to the reference voltage.

Preferably, the reference voltage is equal to a difference between a turn-on threshold voltage of the diode and a preset voltage.

According to a second aspect of the embodiments of the present disclosure, a switching converter is provided. The switching converter comprises a main switching transistor, a synchronous switching transistor, an inductor, an output capacitor, and the low-voltage startup circuit.

In the switching converter and the low-voltage startup circuit of the switching converter according to the embodiments of the present disclosure, the low-voltage startup circuit is configured to perform a comparison between the input voltage and the reference voltage, and adjust the substrate voltage of the main switching transistor according to a result of the comparison. When the input voltage is lower than/equal to the reference voltage, the low-voltage startup circuit is configured to increase the substrate voltage of the main switching transistor, and then the turn-on threshold voltage of the main switching transistor can be reduced, so that the main switching transistor may be normally turned on when the input voltage is low, and the low-voltage startup capability of the switching converter is improved.

Further, the low-voltage startup circuit of the switching converter further comprises the operational amplifier. The operational amplifier is configured to clamp the substrate voltage of the main switching transistor to be within a certain range to avoid a latch-up effect caused by an excessively high substrate voltage of the main switching transistor.

BRIEF DESCRIPTION OF THE DRAWINGS

The above and other objects, features and advantages of the present disclosure will become more apparent from the description of the embodiments of the present disclosure below with reference to the accompanying drawings, wherein.

DETAILED DESCRIPTION OF EMBODIMENTS OF THE DISCLOSURE

Figure 1:
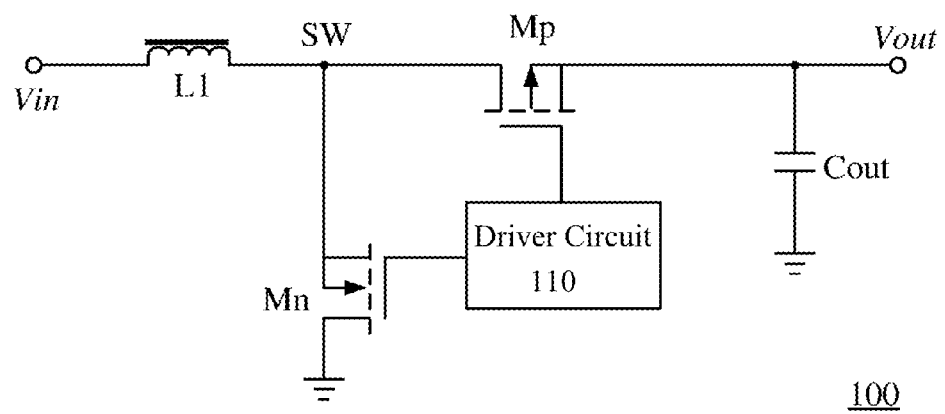
FIG. 1 illustrates a schematic structural diagram of a switching converter in the prior art.

Various embodiments of the present disclosure will be described in more detail below with reference to the accompanying drawings. In various drawings, the same elements are denoted by the same or similar drawing symbols. For the sake of clarity, various parts in the drawings are not drawn to scale.

It should be understood that, in the following description, "circuit" refers to a conductive circuit formed by at least one element or sub-circuit through electrical or electromagnetic connection. When an element or circuit is referred to as being "connected to"/"coupled to" another element or an element/circuit is "connected"/"coupled" between two nodes, it can be directly coupled or connected to another element or an intermediate element may be present, and the elements may be connected physically, logically, or both. Instead, when an element is referred to as being "directly coupled to" or "directly connected to" another element, it is meant that there is no intermediate element present between the elements.

In this application, a switching transistor is a transistor that operates in a switching mode to provide a current path, and comprises one selected from a bipolar transistor or field effect transistor. A first current terminal and a second current terminal of the switching transistor are respectively a high potential terminal and a low potential terminal on the current path, and a control terminal of the switching transistor is configured to receive a drive signal so as to control turn-on and turn-off of the switching transistor.

The present disclosure is further described below with reference to the accompanying drawings and embodiments.

Figure 2:
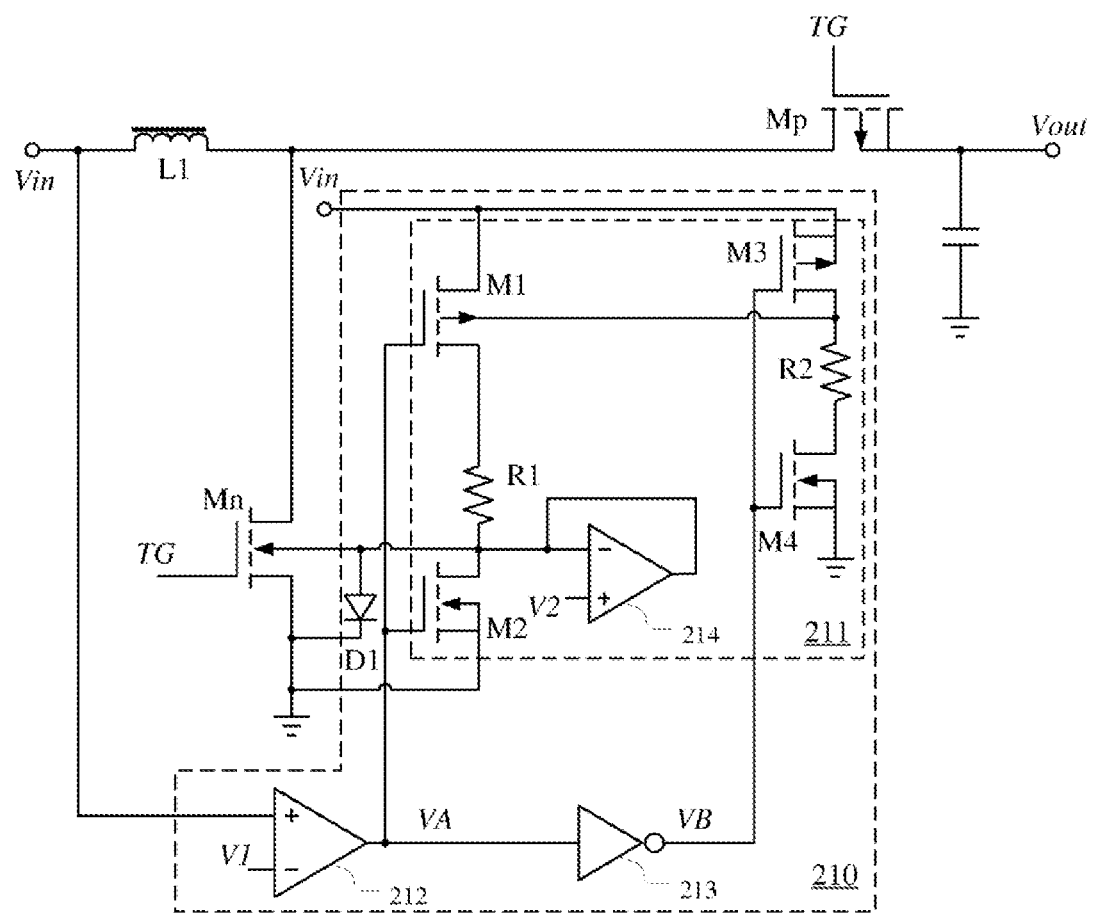
FIG. 2 illustrates a schematic structural diagram of a switching converter according to an embodiment of the present disclosure.

FIG. 2 illustrates a schematic circuit diagram of a switching converter according to an embodiment of the present disclosure. A switching converter 200 comprises a low-voltage startup circuit 210 and a power stage circuit that are integrated in a single integrated circuit chip. The low-voltage startup circuit 210 comprises a substrate voltage control module 211, a comparator 212, an inverter 213, and an operational amplifier 214. The power stage circuit comprises discrete components such as a main switching transistor Mn, a synchronous switching transistor Mp, an inductor L1 and an output capacitor Cout, and a load.

The switching converter 200 is configured to provide a direct current output voltage Vout for the load. With reference to FIG. 2, the inductor L1 and the main switching transistor Mn of the power stage circuit are connected in series between a direct current input voltage Vin and the ground; a first current terminal of the synchronous switching transistor Mp is connected to a node coupled between the inductor L1 and the main switching transistor Mn, and a second current terminal of the synchronous switching transistor Mp is connected to the direct current output voltage Vout; and the output capacitor Cout is connected between the second current terminal of the synchronous switching transistor Mp and the ground. Turn-on and turn-off states of the main switching transistor Mn and the synchronous switching transistor Mp are controlled by the drive signal TG, which is, for example, a duty cycle signal. The main switching transistor Mn is, for example, an N-type field effect transistor, and the synchronous switching transistor Mp is, for example, a P-type field effect transistor. In each switching cycle, the main switching transistor Mn and the synchronous switching transistor Mp are alternately turned on and off, thereby making the inductor L1 alternately store and supply electrical energy. During operation of the switching converter 200, when the main switching transistor Mn is turned on and the synchronous switching transistor Mp is turned off, the inductor L1 starts to store electrical energy. Then, when the main switching transistor Mn is turned off and the synchronous switching transistor Mp is turned on, the inductor L1 starts to supply electrical energy to the output capacitor Cout, thereby making the direct current output voltage Vout gradually increases.

The low-voltage startup circuit 210 is configured to increase a substrate voltage of the main switching transistor Mn when the input voltage Vin is lower than a preset reference voltage, so as to reduce a turn-on threshold voltage of the main switching transistor Mn, so that the main switching transistor Mn may be turned on normally when the input voltage Vin is low, and the low-voltage startup capability of the switching converter 200 is improved.

Preferably, the comparator 212 is configured to perform a comparison between the input voltage Vin and the reference voltage V1 and obtain a voltage detection signal VA according to a result of the comparison. The inverter 213 is configured to provide an inverted signal VB of the voltage detection signal VA for the substrate voltage control module 211. The substrate voltage control module 211 is configured to adjust the substrate voltage of the main switching transistor Mn according to level states of the voltage detection signal VA and the inverted signal VB thereof. When the voltage detection signal indicates that the input voltage Vin is lower than/equal to the reference voltage V1, the substrate voltage control module 211 increases the substrate voltage of the main switching transistor Mn.

In a non-limiting embodiment, the substrate voltage control module 211 comprises transistors M1-M4 and resistors R1 and R2. The transistors M1 and M3 are, for example, P-type field effect transistors, and the transistors M2 and M4 are, for example, N-type field effect transistors.

The transistor M1, the resistor R1 and the transistor M2 are connected in series between the input voltage Vin and the ground in sequence. An intermediate node coupled between the resistor R1 and the transistor M2 is connected to a substrate of the main switching transistor Mn. Gates of the transistors M1 and M2 are configured to receive the voltage detection signal VA. The transistor M1 is configured to charge the substrate of the main switching transistor Mn according to the input voltage Vin when the transistor M1 is turned on, so as to reduce the turn-on threshold voltage of the main switching transistor Mn. The transistor M2 is configured to discharge the substrate of the main switching transistor Mn when he transistor M2 is turned on, so as to pull the substrate voltage of the main switching transistor Mn down to the ground.

The transistor M3, the resistor R2 and the transistor M4 are connected in series between the input voltage Vin and the ground in sequence. An intermediate node coupled between the resistor R2 and the transistor M3 is connected to a substrate of the transistor M1. Gates of the transistor M3 and the transistor M4 are configured to receive the inverted signal VB of the voltage detection signal VA. The transistor M3 is configured to charge the substrate of the transistor M1 according to the input voltage Vin when the transistor M3 is turned on. The transistor M4 is configured to discharge the substrate of the transistor M1 when the transistor M4 is turned on, so as to pull the substrate voltage of the transistor M1 down to the ground.

When the input voltage Vin is lower than/equal to the reference voltage V1, the voltage detection signal VA is at a low level, the inverted signal VB of the voltage detection signal VA is at a high level, the transistor M3 is turned off, the transistor M4 is turned on, the substrate voltage of the transistor M1 is pulled down, then a turn-on threshold voltage of the transistor M1 is reduced, and at this time, the resistor R2 mainly plays the role of current limiting. Then the transistor M1 is turned on, the transistor M2 is turned off, the substrate voltage of the main switching transistor Mn is pulled up, the turn-on threshold voltage of the main switching transistor Mn is reduced, and at this time, the resistor R1 mainly plays the role of current limiting. Finally, the main switching transistor Mn may be normally turned on and off when the input voltage Vin is low, and the low-voltage startup capability of the switching converter 200 is improved.

When the input voltage Vin is higher than the reference voltage V1, an output of the comparator 212 is inverted, the voltage detection signal VA is inverted to be at a high level, and the inverted signal VB of the voltage detection signal VA is inverted to be at a low level. The transistors M2 and M3 are turned on, the transistors M1 and M4 are turned off, the substrate voltage of the transistor M1 is equal to the input voltage Vin, and the substrate of the main switching transistor Mn is grounded, so that the switching converter 200 may operate normally.

Further, the low-voltage startup circuit 210 further comprises a diode D1 located between the substrate and a source of the main switching transistor Mn. When the substrate voltage of the main switching transistor Mn is higher than a turn-on threshold voltage of the diode D1, a parasitic diode of the main switching transistor Mn will be turned on, causing a latch-up effect. Therefore, this embodiment further comprises an operational amplifier 214. The operational amplifier 214 is configured to clamp the substrate voltage of the main switching transistor Mn to be within a certain voltage range. Preferably, the operational amplifier 214 has an inverting input terminal connected to the substrate of the main switching transistor Mn to receive the substrate voltage, a non-inverting input terminal configured to receive a reference voltage V2, and an output terminal connected with the inverting input terminal. The reference voltage V2 is equal to a difference between the turn-on threshold voltage of the diode D1 and a preset voltage (e.g., 0.2 V). The operational amplifier 214 is configured to clamp the substrate voltage of the main switching transistor according to the reference voltage V2, thereby making the substrate voltage of the main switching transistor always lower than the reference voltage V2.

In conclusion, in the switching converter of the present disclosure, the low-voltage startup circuit is configured to perform a comparison between the input voltage and the reference voltage and adjust the substrate voltage of the main switching transistor according to a result of the comparison. When the input voltage is lower than/equal to the reference voltage, the low-voltage startup circuit increases the substrate voltage of the main switching transistor, and then the turn-on threshold voltage of the main switching transistor can be reduced, so that the main switching transistor may be normally turned on when the input voltage is low, and the low-voltage startup capability of the switching converter is improved.

Further, the low-voltage startup circuit of the switching converter further comprises the operational amplifier. The operational amplifier is configured to clamp the substrate voltage of the main switching transistor to be within a certain range to avoid the latch-up effect caused by an excessively high the substrate voltage of the main switching transistor.

An implementation principle of the switching converter according to the embodiment of the present disclosure is described in detail above. Likewise, the present disclosure may also be applied to a control method of the switching converter. For the switching converter using the low-voltage control method, when the input voltage is lower than/equal to the reference voltage, the low-voltage startup circuit can increase the substrate voltage of the main switching transistor, and then the turn-on threshold voltage of the main switching transistor can be reduced, so that the main switching transistor may be normally turned on when the input voltage is low, and the low-voltage startup capability of the switching converter is improved.

The embodiments in accordance with the present disclosure are described above, and these embodiments neither exhaustively describe all the details nor limit the present disclosure to only specific embodiments. Obviously, many modifications and variations are possible in light of the above description. The present specification selects and specifically describes these embodiments to better explain the principle and practical use of the present disclosure, so that those skilled in the art may make good use of the present disclosure and modifications based on the present disclosure. The protection scope of the present disclosure should be based on the scope defined in the claims of the present disclosure.

What is claimed is:

1. A low-voltage startup circuit of a switching converter, wherein the switching converter comprises a main switching transistor, a synchronous switching transistor, an inductor and an output capacitor, and the low-voltage startup circuit comprises:

a comparator, configured to perform a comparison between an input voltage and a reference voltage and obtain a voltage detection signal according to a result of the comparison; and a substrate voltage control module, configured to adjust a substrate voltage of the main switching transistor according to the voltage detection signal, wherein when the voltage detection signal indicates that the input voltage is lower than/equal to the reference voltage, the substrate voltage control module is configured to increase the substrate voltage of the main switching transistor.

2. The low-voltage startup circuit according to claim 1, wherein the substrate voltage control module comprises:

a first transistor, a first resistor and a second transistor that are connected in series between the input voltage and the ground in sequence, wherein an intermediate node coupled between the first resistor and the second transistor is connected to a substrate of the main switching transistor, wherein a gate of the first transistor and a gate of the second transistor are configured to receive the voltage detection signal, wherein the first transistor is configured to charge the substrate of the main switching transistor according to the input voltage when the first transistor is turned on, and the second transistor is configured to discharge the substrate of the main switching transistor when the second transistor is turned on.

3. The low-voltage startup circuit according to claim 2, wherein the substrate voltage control module further comprises:

a third transistor, a second resistor and a fourth transistor that are connected in series between the input voltage and the ground in sequence, wherein an intermediate node of the second resistor and the fourth transistor is connected to a substrate of the first transistor, wherein a gate of the third transistor and a gate of the fourth transistor receive an inverted signal of the voltage detection signal, wherein the third transistor is configured to charge the substrate of the first transistor according to the input voltage when the third transistor is turned on, and the fourth transistor is configured to discharge the substrate of the first transistor when the fourth transistor is turned on.

4. The low-voltage startup circuit according to claim 3, wherein when the voltage detection signal indicates that the input voltage is lower than/equal to the reference voltage, the first transistor and the fourth transistor are turned on; and when the voltage detection signal indicates that the input voltage is higher than the reference voltage, the second transistor and the third transistor are turned on.

5. The low-voltage startup circuit according to claim 3, wherein the first transistor and the third transistor are P-type field effect transistors, and the second transistor and the fourth transistor are N-type field effect transistors.

6. The low-voltage startup circuit according to claim 1, further comprising a diode connected between the substrate and a source of the main switching transistor.

7. The low-voltage startup circuit according to claim 6, further comprising:

an operational amplifier, having an inverting input terminal connected to the substrate of the main switching transistor, a non-inverting input terminal configured to receive the reference voltage, and an output terminal connected with the inverting input terminal, wherein the operational amplifier is configured to clamp the substrate voltage of the main switching transistor according to the reference voltage.

8. The low-voltage startup circuit according to claim 7, wherein the reference voltage is equal to a difference between a turn-on threshold voltage of the diode and a preset voltage.

9. A switching converter, comprising:

a main switching transistor, a synchronous switching transistor, an inductor and an output capacitor; and the low-voltage startup circuit according to claim 1.

10. The switching converter according to claim 9, wherein the substrate voltage control module comprises:

a first transistor, a first resistor and a second transistor that are connected in series between the input voltage and the ground in sequence, wherein an intermediate node coupled between the first resistor and the second transistor is connected to a substrate of the main switching transistor, wherein a gate of the first transistor and a gate of the second transistor are configured to receive the voltage detection signal, wherein the first transistor is configured to charge the substrate of the main switching transistor according to the input voltage when the first transistor is turned on, and the second transistor is configured to discharge the substrate of the main switching transistor when the second transistor is turned on.

11. The switching converter according to claim 10, wherein the substrate voltage control module further comprises:

a third transistor, a second resistor and a fourth transistor that are connected in series between the input voltage and the ground in sequence, wherein an intermediate node of the second resistor and the fourth transistor is connected to a substrate of the first transistor, wherein a gate of the third transistor and a gate of the fourth transistor receive an inverted signal of the voltage detection signal, wherein the third transistor is configured to charge the substrate of the first transistor according to the input voltage when the third transistor is turned on, and the fourth transistor is configured to discharge the substrate of the first transistor when the fourth transistor is turned on.

12. The switching converter according to claim 11, wherein when the voltage detection signal indicates that the input voltage is lower than/equal to the reference voltage, the first transistor and the fourth transistor are turned on; and when the voltage detection signal indicates that the input voltage is higher than the reference voltage, the second transistor and the third transistor are turned on.

13. The switching converter according to claim 11, wherein the first transistor and the third transistor are P-type field effect transistors, and the second transistor and the fourth transistor are N-type field effect transistors.

14. The switching converter according to claim 9, further comprising a diode connected between the substrate and a source of the main switching transistor.

15. The switching converter according to claim 14, further comprising:

an operational amplifier, having an inverting input terminal connected to the substrate of the main switching transistor, a non-inverting input terminal configured to receive the reference voltage, and an output terminal connected with the inverting input terminal, wherein the operational amplifier is configured to clamp the substrate voltage of the main switching transistor according to the reference voltage.

16. The switching converter according to claim 15, wherein the reference voltage is equal to a difference between a turn-on threshold voltage of the diode and a preset voltage.

* * * * *